(12) United States Patent
Maruyama et al.

(10) Patent No.: US 6,651,097 B1
(45) Date of Patent: Nov. 18, 2003

(54) LEARNING SUPPORT METHOD, SYSTEM AND COMPUTER READABLE MEDIUM STORING LEARNING SUPPORT PROGRAM

(75) Inventors: Mina Maruyama, Nerima-ku (JP); Kiyoshi Nakabayashi, Nerima-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/478,770

(22) Filed: Jan. 6, 2000

(30) Foreign Application Priority Data

Jan. 28, 1999 (JP) .......................... 11-020395

(51) Int. Cl.[7] .................. G06F 15/173; G06F 15/16
(52) U.S. Cl. .................. 709/223; 709/225; 709/227
(58) Field of Search .................. 709/204, 217, 709/201, 223, 220, 208, 218, 225, 227, 229; 370/400; 434/350, 307 R, 323, 322, 118

(56) References Cited

U.S. PATENT DOCUMENTS

| | | | | |
|---|---|---|---|---|
| 5,802,299 A | * | 9/1998 | Logan et al. ............... | 709/218 |
| 5,974,446 A | * | 10/1999 | Sonnenreich et al. ....... | 709/204 |
| 6,003,076 A | * | 12/1999 | Maruyama et al. ......... | 709/223 |
| 6,195,687 B1 | * | 2/2001 | Greaves et al. ............. | 709/208 |
| 6,356,943 B2 | * | 3/2002 | Murray et al. ............... | 709/220 |
| 6,373,502 B1 | * | 4/2002 | Nielsen ....................... | 345/708 |
| 6,438,580 B1 | * | 8/2002 | Mears et al. ................ | 709/204 |

FOREIGN PATENT DOCUMENTS

| | | |
|---|---|---|
| JP | 7-313053 | 12/1995 |
| JP | 9-124309 | 5/1997 |
| JP | 9-153912 | 6/1997 |
| JP | 10-320334 | 12/1998 |
| JP | 11-3201 | 1/1999 |
| WO | WO 00/38135 | 6/2000 |
| WO | WO 00/38141 | 6/2000 |

* cited by examiner

Primary Examiner—Meng-Al T. An
Assistant Examiner—Kenny Lin
(74) Attorney, Agent, or Firm—Kenyon & Kenyon

(57) ABSTRACT

A learning support method is provided, in which sophisticated learning support services which a learning support server provides can be used by using a tag rewriting rule, history information can be obtained, and a sophisticated user interface design, for example, for controlling a window can be realized. The learning support method includes the steps of: retrieving tag information which corresponds to a condition part from information, which is obtained by a learning support server, by using a tag rewriting rule, the tag rewriting rule including the condition part and an action part which describes a process; changing the tag information according to the process in the action part; and providing information in which the tag information is changed to an information terminal.

18 Claims, 17 Drawing Sheets

```
Let's study how to use E-mail. First, let's study
<a href="http://server1/read.htm> how to read </a> a received E-mail.
                 ↑                       ↑           ↖
             START TAG                ELEMENT      END TAG
```

```
<a href="http://host/dictionary.htm/write> How to write </a>
a received E-mail will be described briefly.
```

```
DICTIONARY PAGE
  <a name=read>How to read...
  <a name=write>How to write......
```

<a href="http://host/write.html target=window2> How to write </a> a received E-mail will be described briefly.

FIG. 4A PRIOR ART

```
<form action="http://server1/cgi-bin/search">
Please input a search word.
<input type=text name=key>
<input type=submit>
</form>
```

FIG. 4B PRIOR ART

Please input a search word.

[ _____ ]

[ submit ]

FIG. 6 PRIOR ART

| PAGE | ORIGINAL LINK | ANCHOR | COMMAND |
|---|---|---|---|
| http://w/1.html | http://w/2.html | NEXT | NEXT |

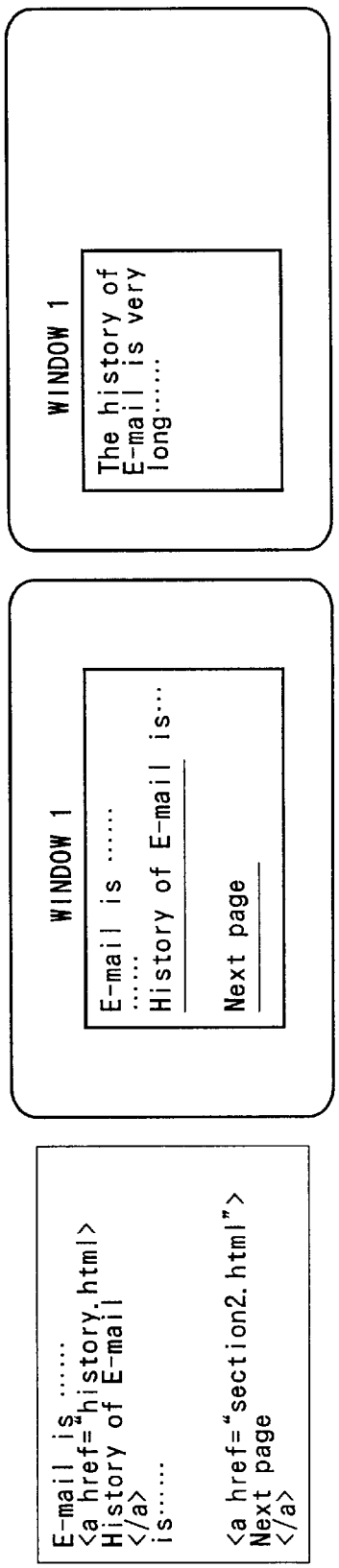
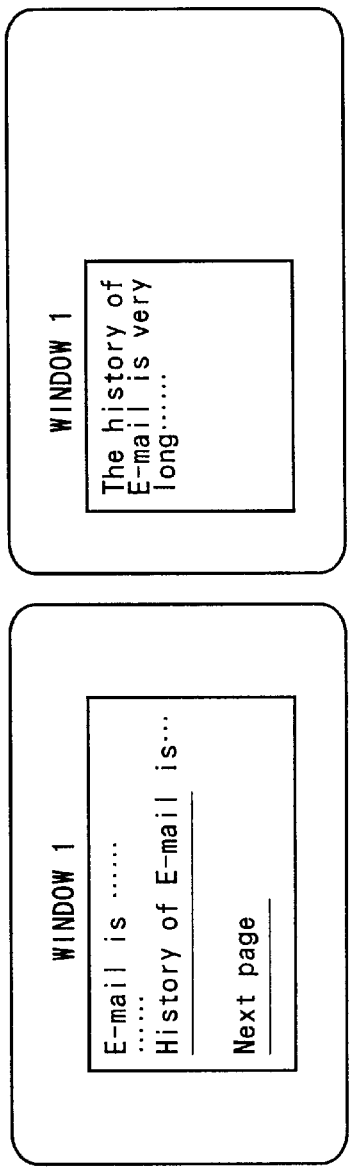
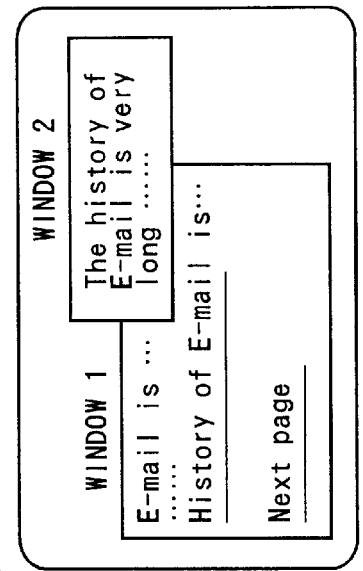
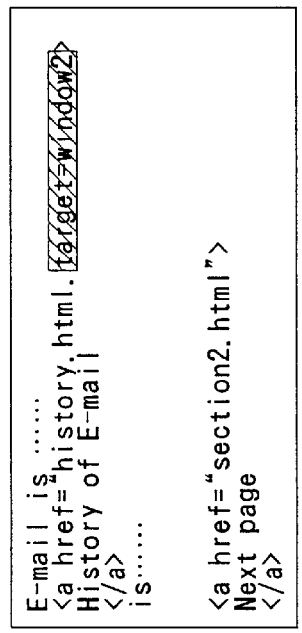

```
E-mail is ...... used in
<a href="dictionary.html#internet">
the Internet
</u>
......

<a href="section2.html">
Next page
</a>
```

FIG. 12A

```
Dictionary page

<a name=icon> Icon
A button which is displayed ......
    .
    .
<a name=internet> Internet
A computer network invented in the
U.S.A. ......
```

FIG. 12B

TAG REWRITING RULE   104

| | CONDITION PART | | ACTION PART | |
|---|---|---|---|---|
| url | tag | tag | | |
| http://host/section1.html | a[href=*.html##*] | a[href=/cgi-bin/DIC.&word=$2] | | |

FIG. 12C

```
E-mail is ... used in <a href=/cgi-bin/DIC.&word=internet">
the Internet
</a>
......
```

```
<form action=/cgi-bin/search>
Please input a keyword.
<input type=text name=key>
<input type=submit>
</form>
```

FIG. 13B

Please input a keyword.

[SEARCH]

FIG. 13C

TAG REWRITING RULE        104

| url | tag | tag |
|---|---|---|
| index.html | form[action=/cgi-bin/search] | form[action=http://host/cgi-bin/DIC] |
| index.html | form.input[name=key] | input[name=word] |

FIG. 13D

```
<form action=/cgi-bin/DIC>
Please input a keyword.
<input type=text name=word>
<input type=submit>
</form>
```

FIG. 14A

```
E-mail is ……
<a href="history.html>
History of E-mail
</a>
is……

<a href="section2.html">
Next page
</a>
```

FIG. 14B

WINDOW 1

E-mail is ……
History of E-mail is……

Next page

| TAG REWRITING RULE | CONDITION PART | | ACTION PART |
|---|---|---|---|
| | url | tag | tag |
| | | a[href=history.html] | DELETE |
| | http://host/section1.html | | |

FIG. 14D

```
E-mail is ……
History of E-mail is
……

<a href="section2.html">
Next page
</a>
```

FIG. 14E

WINDOW 1

E-mail is ……
History of E-mail is……

Next page

FIG. 15

TAG REWRITING RULE

104

| CONDITION PART | | | ACTION PART |
|---|---|---|---|
| url | tag | anchor | tag |
| .* | .* | NEXT PAGE | N E X T |
| .* | .* | PREVIOUS PAGE | P R E V |

LEARNING SUPPORT METHOD, SYSTEM AND COMPUTER READABLE MEDIUM STORING LEARNING SUPPORT PROGRAM

BACKGROUND OF THE INVENTION

1. Field of the Invention

The present invention generally relates to a learning support method, a system and a computer-readable medium storing a learning support program. More particularly, the present invention relates to a learning support method, a system and a computer-readable medium storing a learning support program in an information providing system which includes an information providing server, an information terminal which requests, receives and displays information, and a communication means such as a computer network which connects them. In the information providing system, the information terminal sends a request for information selected by a user to the information providing server. The information providing server selects information based on control information which is provided beforehand and sends the information to the information terminal. The information providing system may be, for example, an information providing system using the Internet, such as the WWW (World-Wide Web) system.

2. Description of the Related Art

In the following, a hypertext system will be described as a first conventional technique. The hypertext system includes an information providing server which is a computer storing information and an information terminal which obtains and displays the information according to a user's operation, the information server and the information terminal being connected via the Internet.

The technique is described, for example, in T. Berners-Lee et al., "The World-Wide Web", Communications of the ACM, vol. 37(8), pp. 76–82.

FIGS. 1A and 1B show an example of an information structure which is provided by the information providing server and a display example. The information shown in FIG. 1A describes not only text information which is visualized by the information terminal but also information which is not visualized and is associated with a part of the text information. The information is called markup information. Usually, software for obtaining and displaying information which is called a browser is used in an information terminal in an information providing system which uses the WWW. The browser displays a page in a rectangular region in a display screen which is called a window. As shown in FIG. 1B, an underscore is drawn at a part where associated information exists. When the user selects information, for example, by clicking a mouse on the part which is underscored in a page in a window, another page corresponding to the part is displayed in the window. For example, when the user clicks on a part "how to read" in FIG. 1B, a page (read.html) describing how to write a mail is displayed in a window 1. The user can obtain necessary information one after another by carrying out the above-mentioned operation repeatedly.

In the following, the markup information will be described taking the WWW as an example. The markup information is distinguished from the visualized text information by bracketing with descriptors "<" and ">". The markup information is placed before and after a part of text information (which will be called element information) which is associated with other information. A part before the element is called a start tag, and a part after the element is called an end tag (The end tag may be omitted according to the kind of the tag). The start tag describes one tag identifier, zero or more numbers of attribute names and/or an attribute name and a value of the attribute name in a format shown below.

<tag identifier attribute attribute=value> The end tag is formatted as follows.

</tag identifier>

There are various kinds of tag identifiers. A representative example is an anchor tag. The anchor tag indicates that there exists another page which is associated with an element (which is called an anchor) corresponding to the anchor tag. The identifier is "a" or "A".

As an attribute of the anchor tag, there is an "href" attribute which indicates a location of the associated information. A format called "URL" shown below is widely used as a format of the value of the "href" attribute.

href=communication protocol name://server name/page identifier

The communication protocol shown above indicates a processing method in which an information providing server and an information terminal transmit/receive information. In FIGS. 1A and 1B, HTTP which is widely used in the WWW is specified. The attribute value which is specified by the href attribute is also called link information. When a link is specified by the page identifier and when the user selects the link, a next page is displayed in the same window from the top of the page.

The href attribute also has a following format.

href=communication protocol name://server name/page identifier# location identifier When a page is specified by using the location identifier, the page is displayed in the window from a location specified by the location identifier. FIGS. 2A–2C shows the examples. When a link show "how to write" in information shown in FIG. 2A is selected, the information terminal obtains a dictionary page (dictionary.html) shown in FIG. 2B. Then, the information terminal displays a page in the window 1 from a location indicated by <a name=write> which is included in the page information. According to a browser, a scroll bar is displayed for indicating that more information exists in the upper or lower part of the page.

An execution result of a program executed in a server can be obtained by specifying a program name and an argument to be executed in the server in an href format shown below:

href=communication protocol name://server name/cgi-bin/program name ? variable1=value1 & variable2=value2.

When such a URL is specified, the information providing server executes a program specified by the program name with an argument "specified variable=value" and sends the execution result to the information terminal.

A target attribute is another attribute of the anchor tag. The target attribute is an attribute for controlling a window in which a page is displayed. The target attribute will be described with reference to FIGS. 3A and 3B. When a user clicks on a link of "how to write" in which a target attribute is specified, a window 2 opens (the name of the window does not appear in actuality) and information on how to write an E-mail is displayed in the window 2. At the time, the window 1 does not change.

Next, a form tag will be described with reference to FIGS. 4A and 4B. The form tag is often used in conjunction with an input tag. The form tag is used for executing a program by using a user input value and returning the execution result. As shown in the figures, a program name "search" is specified with an action attribute of the form tag. Input tags are within the form tags. The input tag is for receiving a user input. Forms for receiving the user input can be selected with a type attribute. For example, a text field for inputting a text is displayed by using "type=text" and a button is displayed by using "type=submit". When a user input a text in the text field and clicks on the submit button, the information server is requested to execute a program "search" with an argument "key=[user input]". Then, the execution result is displayed on the information terminal.

In the following, an concrete application of a conventional first technique will be described. There are many textbooks constructed by using the conventional first technique in the WWW. As a characteristic of a structure of the text book, the text book has a hierarchical structure which includes a chapter, a section and a paragraph, and the text book has a contents page and an index page showing the structure. In addition, the text book includes a search link, a reference link to other part of the text book or to a different text book.

The text book is described by using the above-mentioned tags.

```
[table of contents]
<a href=page1.html>chapter 1...</a>
<a href=page2.html>chapter 2...</a>
<a href=page3.html>chapter 3...</a>
[tags corresponding to a structure of the text
book]
<a href=page1.html>previous page...</a>
<a href=page3.html>next page...</a>
[a tag to an index]
<a href=index.html#IP_address>IP address</a>
[word search]
<form action=/cgi-bin/search>
<input type=text name=key>
<input=submit>
</form>
[reference links to another page of the text book
or to an external page]
... detailed information<a href=http://h/a.html>of
an IP address
</a>is omitted here.
```

Next, a personal adapting type hypertext system, which is a second conventional method, will be described.

The above-mentioned first conventional method can not be used for education since appropriate information corresponding to user's circumstances can not be provided. The personal adapting type hypertext system changes providing information contents so that the information contents are adapted to the user's personal information. The personal-adapting type hypertext system is disclosed in Japanese patent application No. 7-313053, "Information providing method and information providing system", and Japanese patent application No. 9-124309, "Information providing method, system and a computer-readable medium storing information providing program". The personal adapting type hypertext system can be called a web-based training system.

A configuration of the personal adapting type hypertext system will be described with reference to FIG. 5. The personal adapting type hypertext system includes an information terminal 30, 40, an information providing server 10 with contents 20 and a computer network 50, which are also included in the normal hypertext system, and a learning support server 60.

The learning support server 60 includes a request receiving part 61, a file searching/inferring part 62, a scene requesting/obtaining part 63, a scene analyzing/link rewriting part 64 and a sending part 65. A history information file 70, a learning control information file 80 and a link rewriting file 85 are connected to the file searching/inferring part 62. The learning control information file 80 includes a scenario definition file and a target definition file. A scenario in the scenario definition file is used for determining a display order of information when a user learns something. The scenario generally has a hierarchical structure including a chapter, a section, a paragraph and the like. The learning target file includes a concept which a user is to learn, in which the concept is represented by a hierarchical structure.

In the following, the operation of the learning support server 60 will be described.

When request receiving part 61 receives a request from the information terminal, the file searching/inferring part 62 infers a scene which is to be displayed next on the basis of user's learning progress (history information) and learning control information (material structure). Then, the scene requesting/obtaining part 63 requests the inferred scene to the information server and obtains it. The scene analyzing/link rewriting part 64 analyzes the obtained scene and rewrites a link according to the link rewriting file 85. The sending part 65 sends the rewritten scene to the information terminal.

The learning support server 60 stores pages which the user watched and learning targets which the user understood in the history information file 70. When the user requests a next page, the learning support server 60 determines appropriate information for providing to the user based on the above-mentioned scenario definition file and target definition file.

Next, the link rewriting definition file 85 will be described with reference to FIG. 6. The link rewriting definition file 85 has control information for rewriting a link name when the link name which is specified as an original link name exists in a page specified by a page name. More specifically, when a link which has an anchor name of "next screen" exists, generally the link points to a specific page. If the link is converted in advance to a "NEXT" command which requests a next screen appropriate for the progress of learning of the user, the user can receive an appropriate page.

In addition, the learning support server supports various learning support commands such as an "INDEX" command which enables the terminal to display the table of learning contents including the user's progress, and a "DIC" command which provides a dictionary function in accordance with the user's progress. Each command can be applied to anchors such as "table of contents" and "search" which may be commonly seen on a hypertext of the WWW.

By virtue of the link rewriting file 85, it becomes possible to covert an anchor such as a tag ("next page", "previous page" and the like), an index and a term into a command for intellectual support, in which the tag or the index corresponds to a table of contents or a structure of a text book on the WWW which is constructed by using the conventional first technique. As a result, a page appropriate for a user's progress can be provided.

The process by the learning support server will be described with reference to FIG. 7. First, the user sends a command (for example, "NEXT") to the learning support server 60 in step 11. The server 60 checks the scenario definition file and the target definition file against the user's learning history thus far in the history information file 70 in step 12, and determines a screen which will be displayed next in step 13.

Then, the learning support server 60 obtains the determined screen from the information providing server in place of the user's terminal in step 14 and 15. The learning support server 60 analyzes the obtained file in step 16, and, for example, rewrites link information into a command for the learning support server 60 in step 17, when there is an applicable item in a command conversion file, and sends the command to the user in step 18.

According to the above-mentioned process, the user can receive information appropriate for the user's learning progress while the user reads the same visualized information as normal hypertext information and the information terminal sends various commands to the learning support server.

According to the above-mentioned second method, it becomes possible to provide a page appropriate for the user's progress by converting a normal link into a learning support command.

However, a sophisticated personal adapting function provided by the learning support system can not be fully utilized by only such a link conversion capability.

SUMMARY OF THE INVENTION

It is an object of the present invention to provide a learning support method, a system and a computer readable medium storing a learning support program, in which sophisticated learning support services which the learning support server provides can be used by using a tag rewriting rule which is described with a simple description, history information can be obtained, and a sophisticated user interface design, for example, for controlling a window which is indispensable for learning support can be realized.

The above object of the present invention is achieved by a learning support method in a learning support system which includes an information providing server, a learning support server and an information terminal which are connected via a communication means including a computer network, the learning support method comprising the steps of:

obtaining from the information providing server, by the learning support server, information which is to be provided to the information terminal according to history information of a user when the information terminal requests the learning support server to send information;

performing, by the learning support server, a changing process for adding control information necessary for learning support on the information, and providing the information to the information terminal, wherein, when the information which is obtained by the learning support server from the information providing server is hypertext information, the changing process comprises the steps of:

retrieving tag information which corresponds to a condition part from the information by using a tag rewriting rule, the tag rewriting rule including the condition part used for retrieving tag information which is to be changed and an action part which describes a process corresponding to the condition part, the tag information being control information of the hypertext information;

changing the tag information according to the process in the action part; and providing information in which the tag information is changed to the information terminal.

According to the above-mentioned invention, since tag information as well as link information can be changed, a target attribute for operating a window can be controlled, in which the target attribute is an attribute other than the link attribute.

The above-mentioned method may further comprise the steps of:

using a regular expression described by a pattern description language for describing the condition part or the action part;

retrieving the tag information corresponding to the condition part described by the regular expression from the obtained information;

performing the changing process on the tag information according to the action part described by the regular expression.

According to the above-mentioned invention, since the regular expression can be used, various conversion of tag information can be realized.

In the above-mentioned method, the action part may include a command for carrying out a process, the learning support method comprising the step of:

executing the command for changing a pattern corresponding to the condition part.

According to the above-mentioned invention, since a command can be specified in the tag rewriting rule, deleting a link or providing a dictionary function or the like can be realized.

In the above-mentioned learning support method, the condition part of the tag rewriting rule may include an information name, a tag name, an attribute name and an anchor name.

The above object of the present invention is also achieved by a learning support system which includes an information providing server, a learning support server and an information terminal which are connected via a communication means including a computer network, the learning support server comprising:

means for obtaining, from the information providing server, information which is to be provided to the information terminal according to history information of a user when the information terminal requests the learning support server to send information; and changing means for performing a changing process for adding control information necessary for learning support on the information;

the changing means comprising:

a tag rewriting rule which includes a condition part used for retrieving tag information which is to be changed and an action part which describes a process corresponding to the condition part, the tag information being control information of hypertext information;

tag retrieving means for retrieving tag information which corresponds to the condition part from the information which is obtained by the learning support server from the information providing server when the information is hypertext information;

tag changing means for changing the tag information according to the process in the action part; and information providing means for providing information in which the tag is changed to the information terminal.

According to the above-mentioned invention, a learning support system applicable for carrying out the above-mentioned learning support method.

The above object of the present invention is also achieved by a computer readable medium storing program code for causing a computer as a learning support server to support learning in a learning support system which includes an information providing server, the learning support server and an information terminal which are connected via a communication means including a computer network, the computer readable medium comprising:

program code means for obtaining, from the information providing server, information which is to be provided to the information terminal according to history information of a user when the information terminal requests the learning support server to send information; and changing program code means for performing a changing process for adding control information necessary for learning support on the information;

the changing program code means comprising:

program code means for storing a tag rewriting rule which includes a condition part used for retrieving tag information which is to be changed and an action part which describes a process corresponding to the condition part, the tag information being control information of hypertext information;

tag retrieving program code means for retrieving tag information which corresponds to the condition part from the information which is obtained by the learning support server from the information providing server when the information is hypertext information;

tag changing program code means for changing the tag information according to the process in the action part; and information providing program code means for providing information in which the tag is changed to the information terminal.

According to the above-mentioned invention, a computer readable medium storing a learning support program which executes a process of the learning support server can be provided.

BRIEF DESCRIPTION OF THE DRAWINGS

Other objects, features and advantages of the present invention will become more apparent from the following detailed description when read in conjunction with the accompanying drawings, in which:

FIGS. 4A and 4B shows an example of a conventional form tag;

FIG. 6 is an example of a link rewriting definition file according to the conventional second technique;

FIGS. 11A–11F are diagrams for explaining a first embodiment of the present invention;

FIGS. 12A–12D are diagrams for explaining a second embodiment of the present invention;

FIGS. 13A–13D are diagrams for explaining a third embodiment of the present invention;

FIGS. 14A–14E are diagrams for explaining a fourth embodiment of the present invention;

FIG. 15 is a diagram for explaining a fifth embodiment of the present invention;

DETAILED DESCRIPTION OF THE PREFERRED EMBODIMENTS

According to the above-mentioned conventional techniques, there are problems. Specifically, some functions of the learning support server require various arguments (name=value), however, the name or the value of the argument can not be converted into a form suitable for the learning support server by using the conventional link rewriting technique. Thus, the sophisticated learning support function for adapting a user's progress can not be fully provided. For example, the argument can not be converted into a command "DIC" for providing a dictionary function adaptable to a user's learning progress.

In addition, when a command for learning support is executed, it is stored in the learning support server as a history. However, since conversion to a command can not be carried out, it can not be stored as a history. For example, usually, when a user uses a dictionary function of the learning support server, the user's intention of "I want to consult a dictionary for the detailed meaning of a word." is stored as a history, and the history is used for learning support. However, such usage can not be realized according to the conventional link rewriting technique.

In addition, a window control appropriate for learning support can not be performed since a tag for a window operation such as a target attribute can not be controlled. A case is taken as an example in which a link. "next page" and a link to information on a specific word exist in a page and a person who makes a learning material intends that a user learns according to the link "next page". When the user selects a link other than the link "next page", an existing window is overwritten by information selected by the user, as a result, the link "next page" disappears from the display screen. In such a case, if the information selected by the user is displayed in another window, a link to a route to which the material making person wants a user to go does not disappear. However, such a control can not be realized only by the conventional link rewriting technique. In addition, when the material making person does not want the user to select a link other than "next page", the only method which can be taken is to delete the link, which is not realized according to the conventional technique.

Further, a tag having "previous page" or "next page" as an anchor and corresponding to a structure of a text book, or an index tag are typical patterns existing in each page of the text book. It requires complicated descriptions to specify the pattern one-by-one, and it takes much time to add pages.

In the following, embodiments of the present invention will be described.

Figure 8:
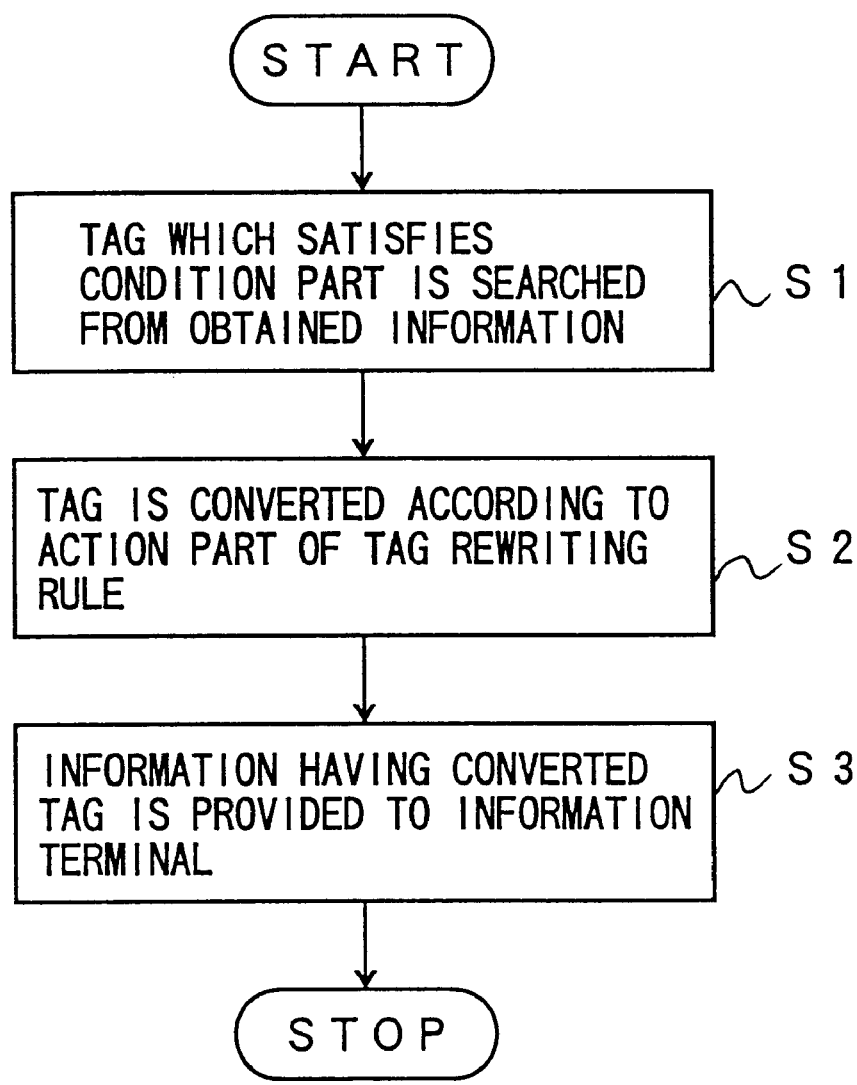
FIG. 8 is a diagram for explaining a principle of the present invention.

FIG. 8 is a diagram for explaining a principle of the present invention. The principle of the present invention will be described with reference to the figure.

According to the present invention, a tag rewriting rule is used when information which is obtained from an information providing server by a learning support server is hypertext information. The tag rewriting rule includes a condition part and an action part. The condition part defines a tag information which is to be converted, the tag information being control information of the hypertext information. The action part represents what process is to be carried out for the conversion. In step 1, a tag which satisfies the condition part is searched from the obtained information. Then, the tag is converted according to the action part of the tag rewriting rule in step 2. After that, information based on the converted tag is provided to an information terminal in step 3.

Figures 1A, 1B:
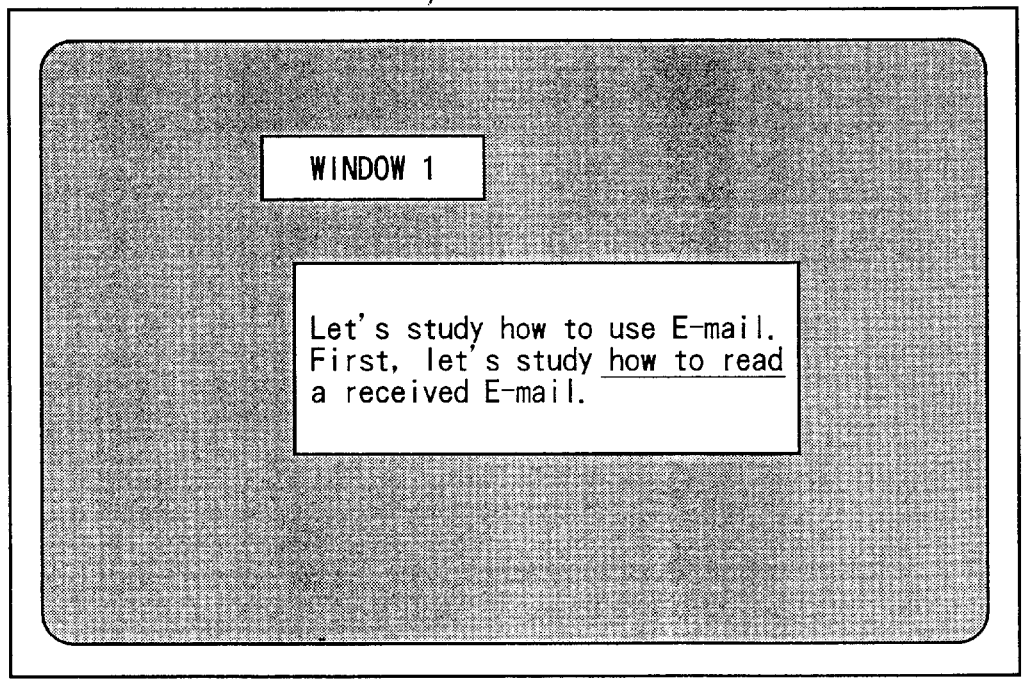
FIGS. 1A and 1B show a first example of an information structure which is provided by an information providing server and a first display example on an information terminal.
Figures 2A, 2B, 2C:
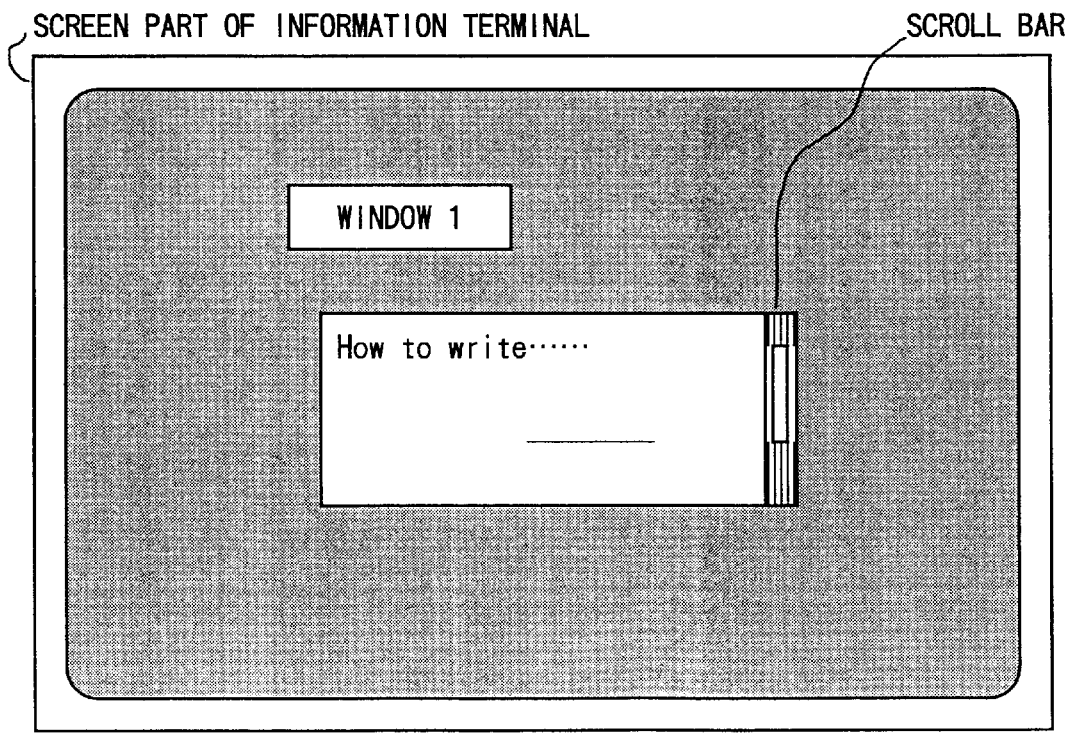
FIGS. 2A–2C show second examples of information structures which are provided by the information providing server and a second display example on the information terminal.
Figures 3A, 3B:
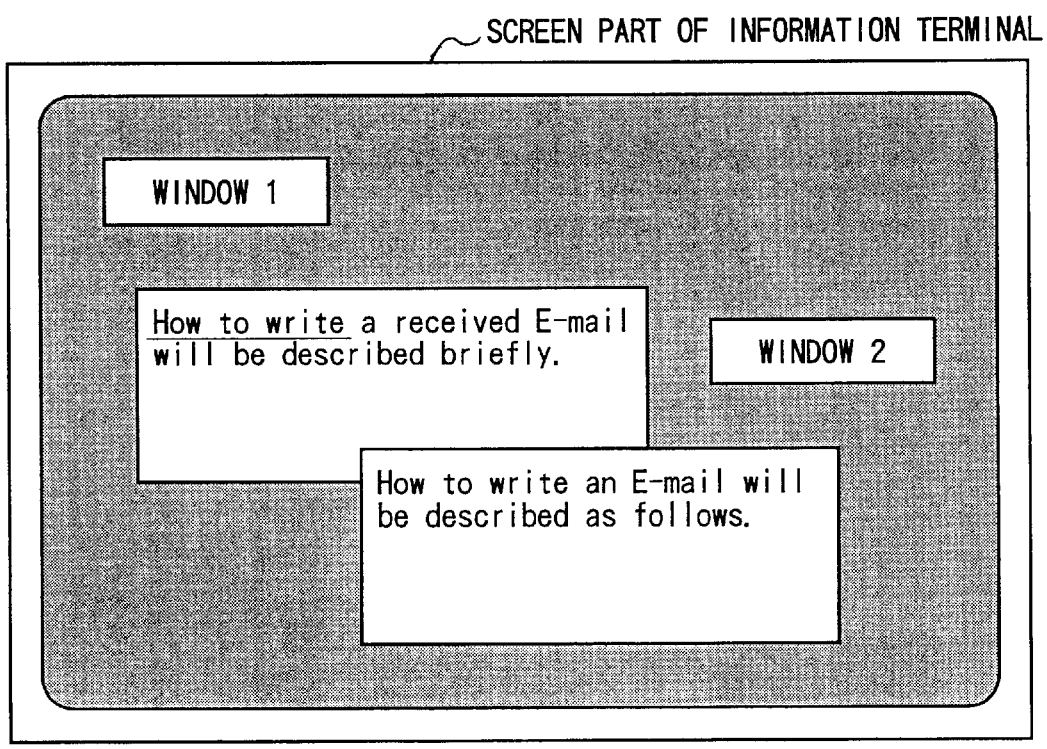
FIGS. 3A and 3B show a third example of an information structure which is provided by the information providing server and a third display example on the information terminal.
Figure 5:
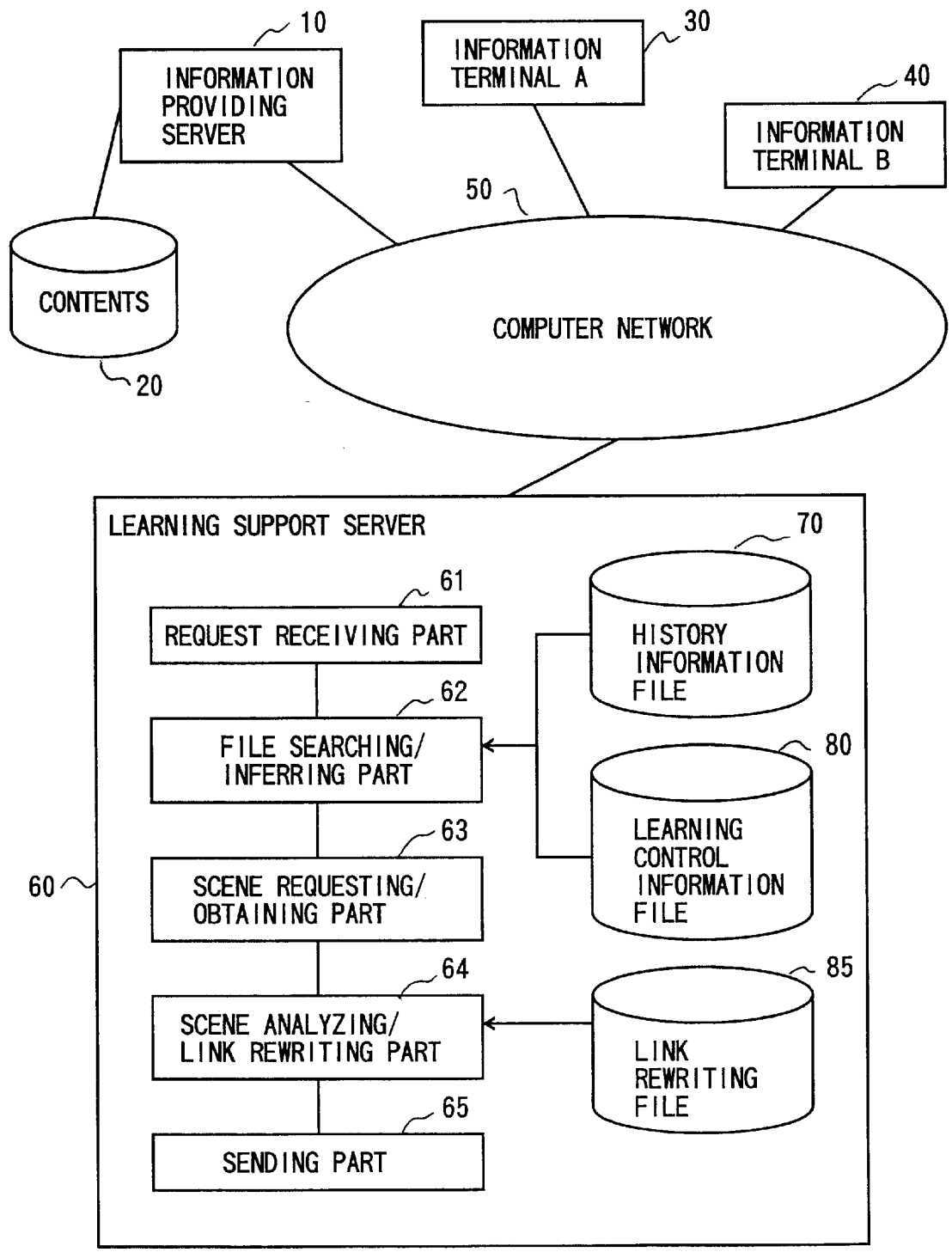
FIG. 5 shows a configuration of a personal adapting type hypertext system according to a conventional second technique.
Figure 7:
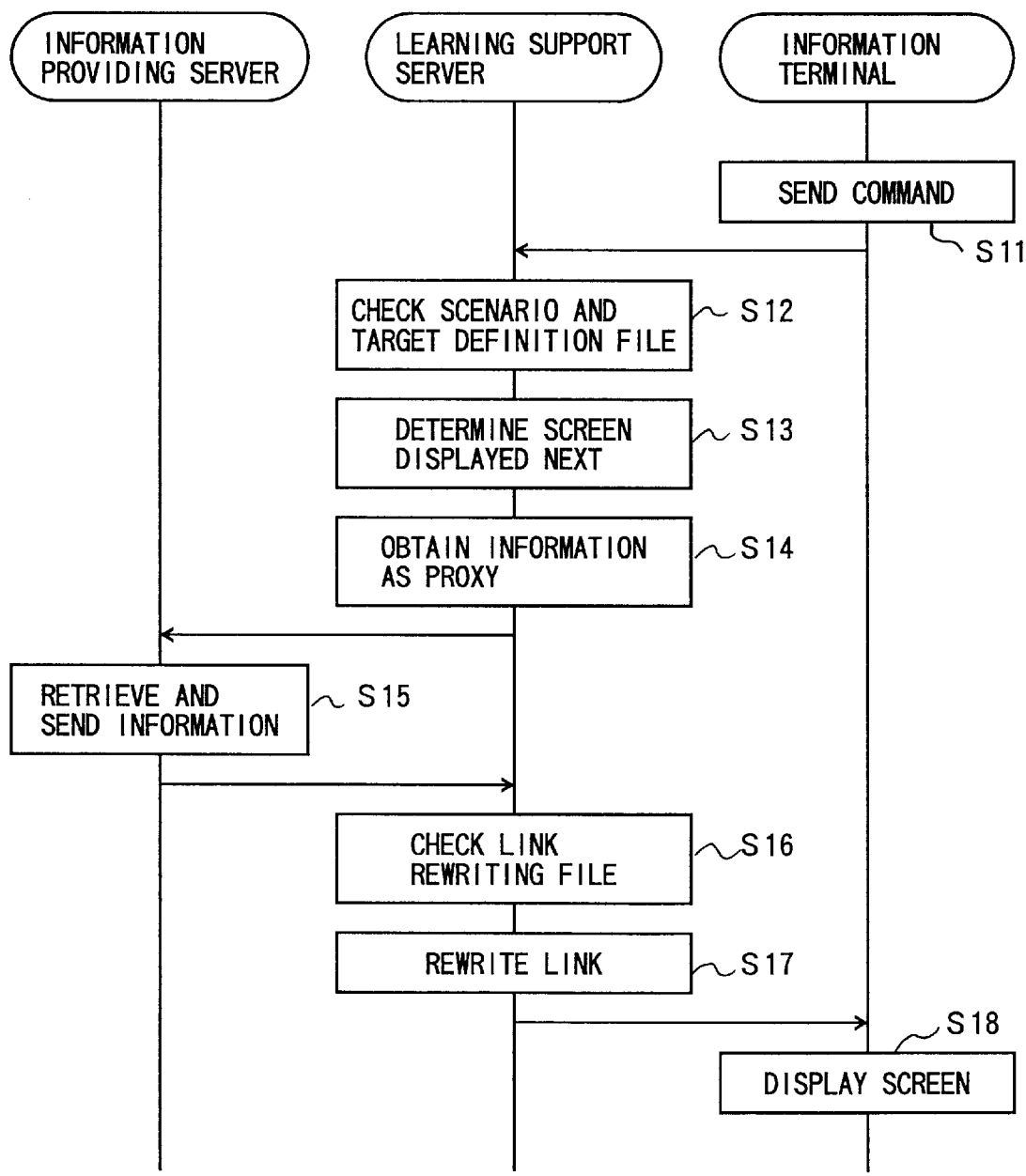
FIG. 7 is a sequence chart of an operation of the learning support server according to the conventional second technique.
Figure 9:
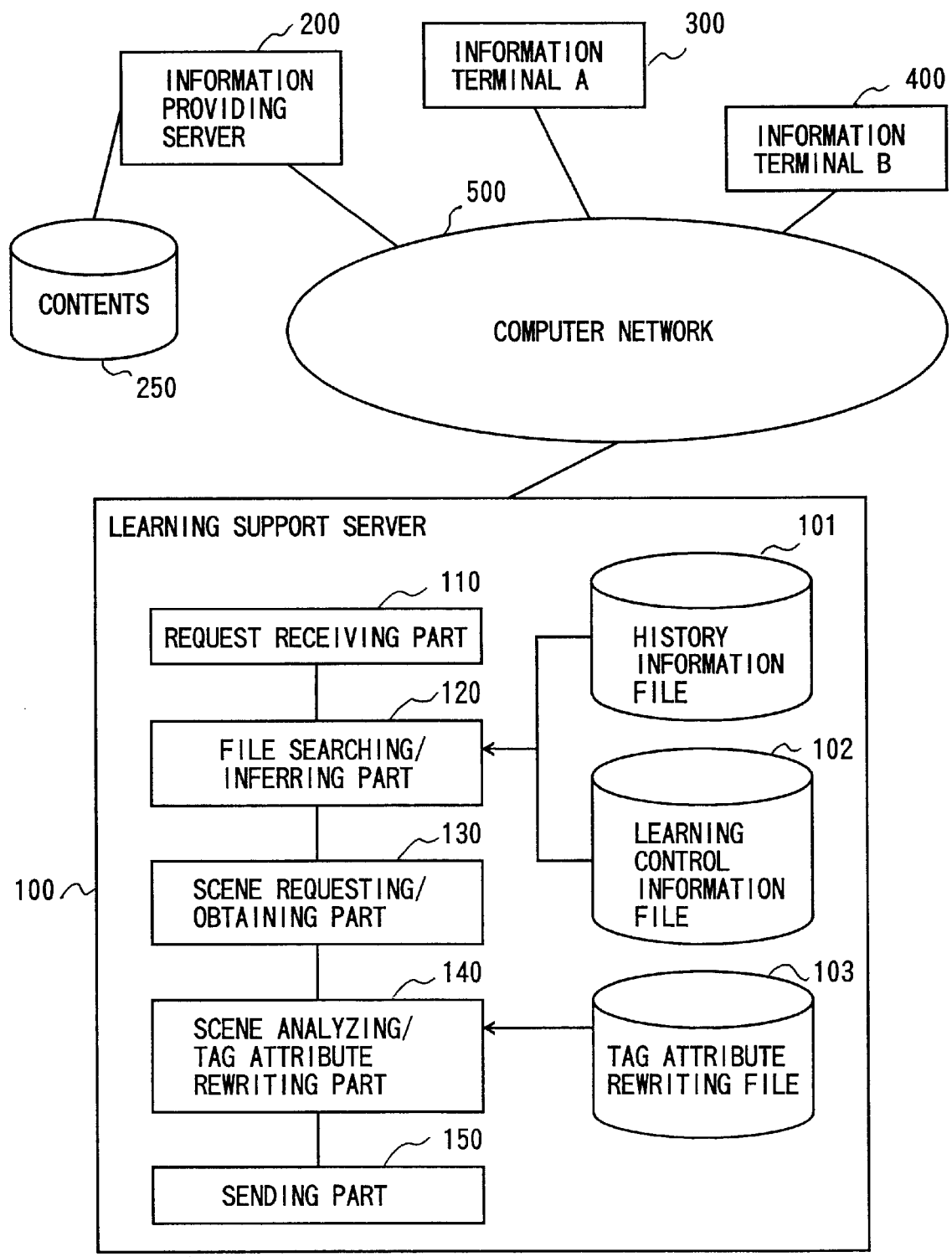
FIG. 9 is a block diagram of a learning support system of the present invention.

FIG. 9 is a block diagram of a learning support system of the present invention. The system shown in the figure includes a learning support server 100, an information providing server 200, an information terminal 300, 400 and a computer network 500 which connects them. The information providing server 200 has the same configuration as the information providing server shown in FIG. 5.

The learning support server 100 includes a request receiving part 110, a sending part 150, a file searching/inferring part 120, a scene requesting/obtaining part 130, a scene analyzing/tag attribute rewriting part 140, a history information file 101, a learning control information file 102 and a tag attribute rewriting file 103. The learning support server 100 also includes the scenario definition file and the target definition file which are not shown in FIG. 9.

The file searching/inferring part 120 selects information for providing to a user by searching the scenario definition file, the target definition file, the user's history information in the history information file 101 and learning control information of the learning control information file 102.

The scene requesting/obtaining part 130 requests information selected by the file searching/inferring part 120 to the information providing server 200.

The scene analyzing/tag attribute rewriting part 140 obtains information requested by the scene requesting/obtaining part 130 from the information providing server 200, and rewrites a tag attribute which includes link information into a command for the learning support server 100 so that the obtained information is changed. A tag rewriting rule, which includes a condition part and an action part, is used here so that information which corresponds to the condition part is changed according to the action part.

The sending part 150 sends a request to the information providing server 100 and sends rewritten information to the information terminal 300, 400 via the computer network 500.

The request receiving part 110 receives requests from the information terminal 300, 400 via the computer network 500 and receives information from the information providing server 100.

The tag attribute rewriting file 103 has at least a tag rewriting rule which includes the condition part which specifies a condition for converting control information of a hypertext (tag information) and the action part for converting the tag information which satisfies the condition. A regular expression may be used for specifying the tag information. The regular expression is described, for example, in "Mastering Regular Expressions" O'Reilly 1997, ISBN1-56592-257-3.

A command for executing a process can be set in the action part of the tag rewriting rule in the tag attribute rewriting file 103. The command can be executed on a pattern which satisfies the condition in the scene analyzing/tag attribute rewriting part 140.

An information name, a tag name, an attribute name, an anchor name and the like may be specified in the condition part in the tag rewriting rule in the tag attribute rewriting file 103.

As mentioned above, according to the conventional technique, only link information in tag attributes can be converted. On the other hand, according to the present invention, any tag attribute can be converted. That is, according to the present invention, a format for the tag rewriting file is extended so that power of expression is increased, since every tag attribute can be converted.

Next, the operation of the above-mentioned configuration will be described.

Figure 10:
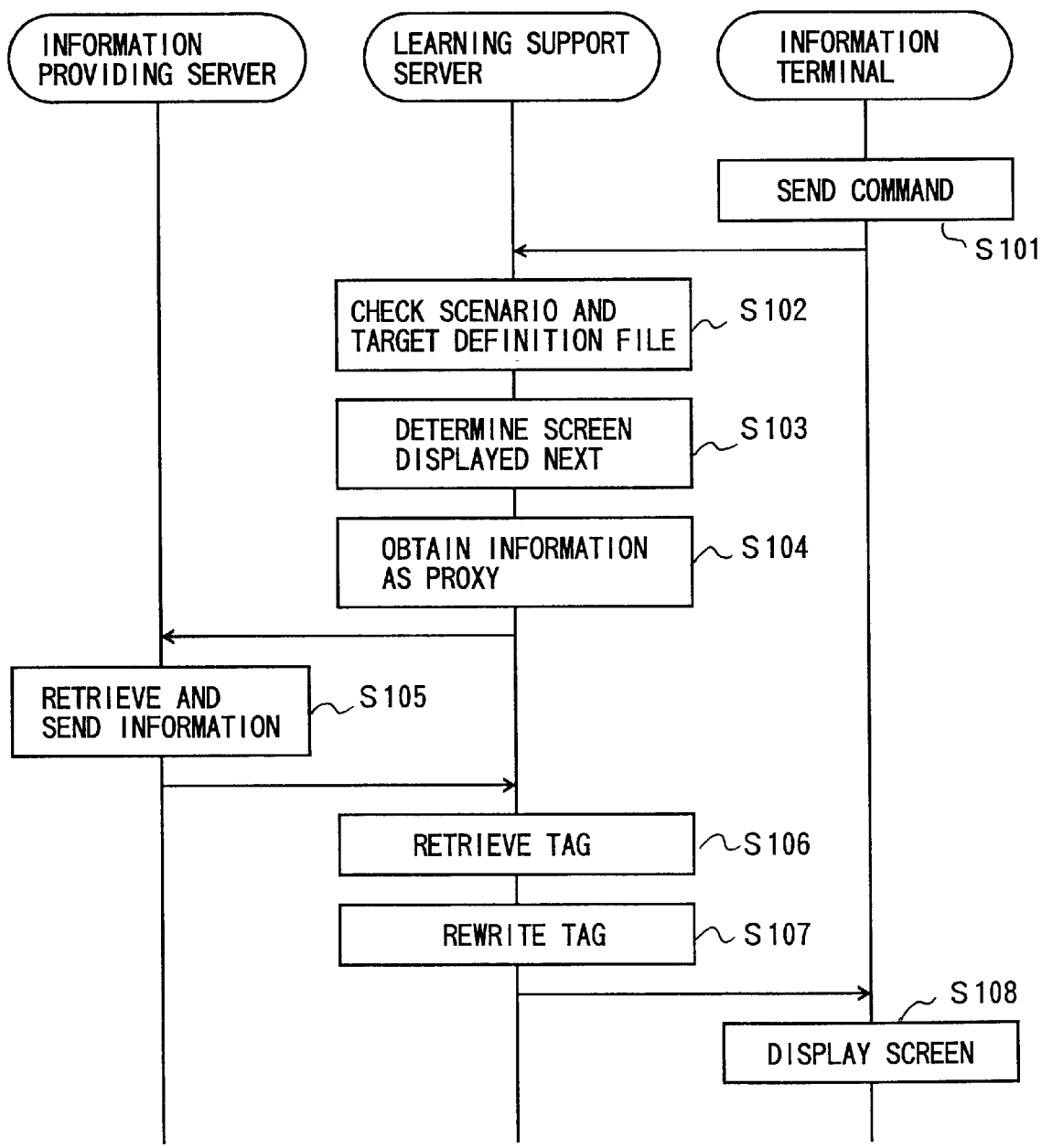
FIG. 10 is a sequence chart of an operation of the learning support system according to the present invention.

FIG. 10 is a sequence chart showing the operation of the present invention.

The information terminal 300 or the information terminal 400 sends a command for requesting information to the learning support server 100 in step 100. The learning support server 100 searches the scenario definition file and the target definition file on the basis of the command sent from the information terminal 300 or 400 in step 102. The file searching/inferring part 120 of the learning support server, in step 103, determines a screen which is displayed next by the information terminal 300 or 400. Then, in step 4, the scene requesting/obtaining part 130 of the learning support server 100 requests information corresponding to the determined screen to the information providing server 200. The information providing server 200 retrieves information requested by the learning support server 100 and sends the retrieved information to the learning support server in step 105.

In step 106, the scene analyzing/tag attribute rewriting part 140 of the learning support server 100 converts link information in the information obtained from the information providing server 200 with reference to the tag attribute rewriting file 103 such that the link information complies with the learning support server 100 in the same way as the conventional second technique. In addition, the scene analyzing/tag attribute rewriting part 140 searches the obtained information for a tag specified by the condition of the tag rewriting rules in the tag attribute rewriting file 103. The tag which satisfies a condition of the rule is rewritten by executing the action part of the rule in step 107. The learning support server 100 sends information which is changed by converting the tag to the information terminal 300 or 400 in step 108. As a result, the information terminal 300 or 400 displays the changed information. The process of the step 106 and 107 can be called a changing process.

In the following, embodiments of the present invention will be described with reference to figures.

First Embodiment

A first embodiment will be described with reference to FIGS. 11A–11F.

FIG. 11A shows information before a conversion which is stored in the information providing server 200. When the information is displayed as—is by the information terminal 300 or 400, it is displayed in a window 1 of the information terminal as shown in FIG. 11B. If a user selects "history of E-mail", the window 1 is overwritten with "history-html" as shown in FIG. 11C. In the case, a link "next page" disappears from the screen.

In the first embodiment, a rule shown in FIG. 11D is used as the tag rewriting rule. As shown in FIG. 11D, the condition of the rule is that a link which has "href= history.html" as an attribute in anchor tags of "section.html" exists, and the action is adding an attribute "target= window2".

When the tag conversion rule is executed, information is converted as shown in FIG. 11E. Therefore, when the user clicks on an anchor "history of E-mail", next information is displayed in another window 2 as shown in FIG. 11F and the original window 1 which has the link "next page" remains in the screen.

Second Embodiment

Next, a second embodiment of the present invention will be described with reference to FIGS. 12A–12D. FIGS. 12A and 12B show information before a conversion which is stored in the information providing server 200. The information terminal displays information shown in FIG. 12A, and, when the user selects an anchor "the Internet", the dictionary page shown in FIG. 12B is displayed with a part <name=internet> at the top of the screen.

In this embodiment, a rule shown in FIG. 12C is used for the tag conversion rule.

As shown in FIG. 12C, the condition is that a link which corresponds to an regular expression "href=*.html#*" in "section.html" exists, and the action is converting the attribute into "href=DIC&word=$2".

Information is converted as shown in FIG. 12D by executing the tag conversion rule. When the user clicks on an anchor "the Internet", the learning support server 100 can execute a command DIC which provides a dictionary function suitable for the user's learning progress with an argument "word=the Internet".

Third Embodiment

In the following, a third embodiment of the present invention will be described with reference to FIGS. 13A–13D. FIG. 13A shows information before a conversion which is stored in the information providing server 200. A program "search" which is specified here is for searching data which is stored in the information providing server 200 for information corresponding to a user input data and sending the value. The information shown in FIG. 13A is displayed as shown in FIG. 13B by the information terminal 300 or 400.

In this embodiment, a rule shown in FIG. 13C is used for the tag rewriting rule.

As shown in FIG. 13C, according to the rule, a form tag which has an attribute "action=search" in form tags within "index.html" is converted into "action=DIC". In addition, "form input[ ]" in the second line means that "name=key" of an input tag nested in the form tag shown in the first line is converted into "name=word".

After the above-mentioned conversion is carried out in the scene analyzing/tag attribute rewriting part 140, the information is converted as shown in FIG. 13D. Accordingly, when the user input a word, the learning support server 100 executes a program DIC with an argument "word=a user input value".

Fourth Embodiment

Next, a fourth embodiment will be described with reference to FIGS. 14A–14E. In FIG. 14A, information before a conversion which is stored in the information providing server 200 is the same as that of the above-mentioned first embodiment. When a link "history of E-mail" should not be selected by the user, a tag rewriting rule shown in FIG. 14C is used. According to the tag rewriting rule, a process program (DELETE) for deleting the link (deleting link capability) is used. In the example of the figure, "DELETE" is specified in the field of "tag" of the action part.

Accordingly, the link is deleted as shown in FIG. 14D such that a window without the link can be displayed to the user as shown in FIG. 14E.

Fifth Embodiment

In the following, a fifth embodiment will be described with reference to FIG. 15. According to the tag rewriting rule of the figure, ".*" is specified to a page or a link. ".*", which is a regular expression, means that the condition applies to all URLs or tags when they have the specified anchor. Accordingly, even when a link which has "next page" or "previous page" as an anchor is described in many pages, the tag rewriting rule can be described by using two lines, in which "next page" or "previous page" is a typical pattern.

Sixth Embodiment

Figures 16A, 16B, 16C, 16D:
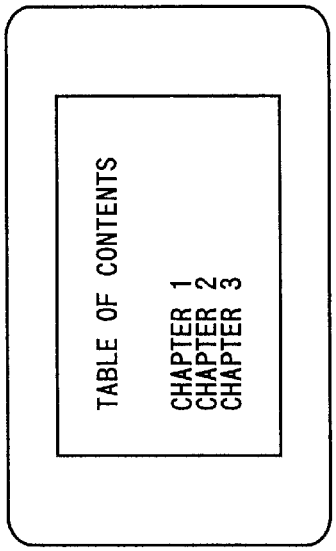
FIGS. 16A–16D are diagrams for explaining a sixth embodiment of the present invention.

In the following, a sixth embodiment will be described with reference to FIGS. 16A–16D. FIG. 16A shows a page of a table of contents which is stored in the information providing server 200. When the user selects a link to the table of contents, a fixed screen shown in FIG. 16B always appears.

In the sixth embodiment, a tag rewriting rule shown in FIG. 16C is used. The rule means that every link which has an anchor "to table of contents" is converted into an INDEX command for showing the user's progress. Accordingly, a screen which reflects the user's progress can be displayed. For example, as shown in FIG. 16D, a check mark is displayed at a page which the user finished learning and an arrow is displayed at a page under leaning.

Seventh Embodiment

For all above-mentioned embodiments, a link to which any tag rewriting rule can not be applied can be converted into an link which includes an original link information as follows in the scene analyzing/tag attribute rewriting part 140.

<a href=/cgi-bin/command=dont_care&link=a.html>

Here, "command=dont_care" means that the learning support server 100 obtains a page which is specified by "link", and provides the page to the user after converting the page by using the tag rewriting rule in the scene analyzing/tag attribute rewriting part 140. Thereby, the user can obtain services from the learning support server 100 without interruption while receiving a desired page. In addition, the learning support server 100 can keep records of accessing external servers as the user's history information.

It is also possible to delete, in the scene analyzing/tag attribute rewriting part 140, all links to which any tag rewriting rule can not be applied.

The above-mentioned embodiments are described taking HTML of the WWW as an example. However, the present invention can be applied to XML (extensible markup language) or other languages.

The above-mentioned embodiments were described based on the configuration shown in FIG. 9. However, the present invention can be realized by a computer having a program for carrying out the above-mentioned processes.

Figure 17:
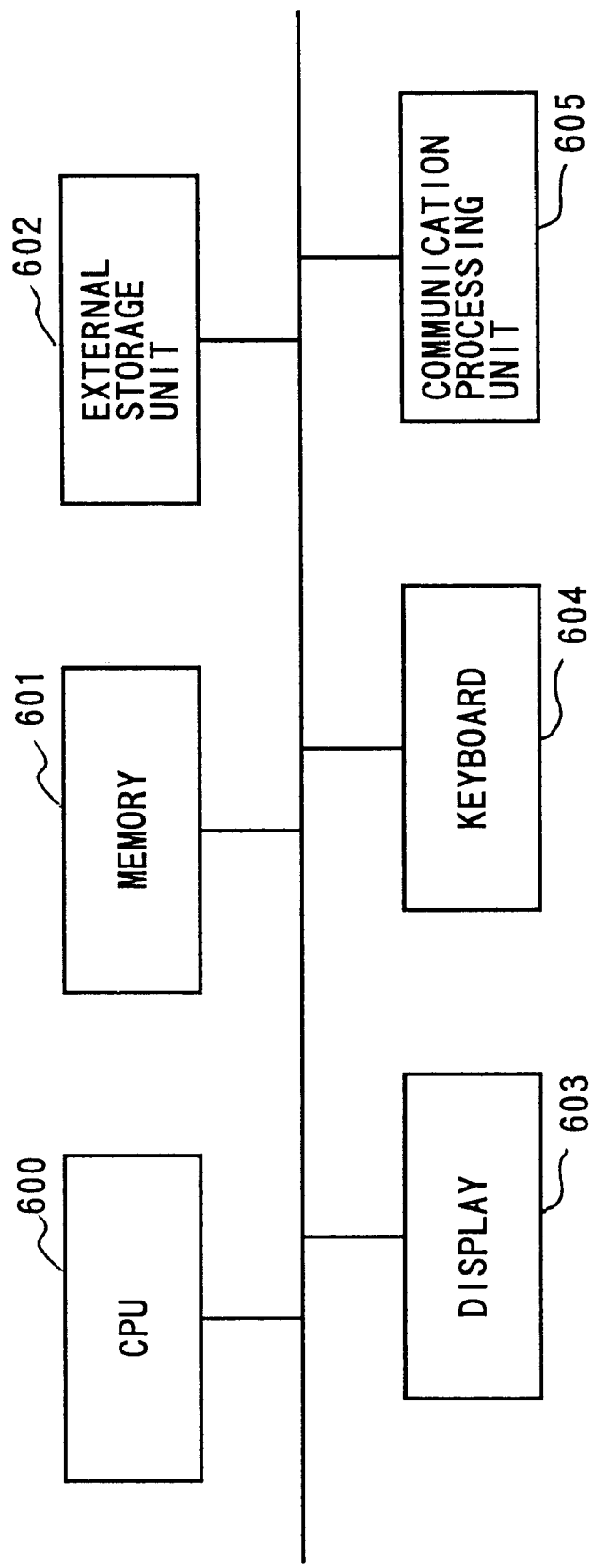
FIG. 17 is a block diagram showing a hardware configuration of a computer system.

FIG. 17 is a block diagram showing a hardware configuration of such a computer system. As shown in FIG. 17, the computer system includes a CPU 600 by which a process of a program is executed, a memory 601 for storing data and a program, an external storage unit 602 for storing data and a program used for the memory 601 or the CPU 600, a display 603 for displaying data, a keyboard 604 for inputting data or commands, and a communication processing unit 605 which enables the computer system to communicate with other computers via a network. The program is installed in the memory 601 or the external storage unit 602 and is executed by the CPU 600.

The computer readable medium which stores the program of the present invention corresponds to the memory 601 or the external storage unit 602. In addition, a memory, a hard disk, and a transportable medium such as a floppy disk, a CD-ROM, a magnetic tape and the like can be used as a computer readable medium of the present invention. By loading the program stored in the medium of the present invention in a computer system, the computer system can carry out the learning support method of the present invention. In addition, the program can be preinstalled in a computer system.

As mentioned above, according to the present invention, the sophisticated learning support service which the learning support server provides can be used by using the tag rewriting rule which is described with a simple description. In addition, the history information can be obtained. Further, a sophisticated user interface design, for example, for controlling a window which is indispensable for learning support can be realized.

The present invention is not limited to the specifically disclosed embodiments, and variations and modifications may be made without departing from the scope of the invention.

What is claimed is:

1. A learning support method performed by a learning support server in a learning support system which includes an information providing server, said learning support server and an information terminal which are connected via a communication means including a computer network, said learning support method comprising the steps of:

obtaining from said information providing server, by said learning support server, information which is to be provided to said information terminal according to history information of a user when said information terminal requests said learning support server to send information;

performing, by said learning support server, a changing process for changing control information necessary for learning support on said information, and providing said information to said information terminal, wherein, when said information which is obtained by said learning support server from said information providing server is hypertext information, said changing process comprises the steps of:

retrieving tag information which corresponds to a condition part from said information by using a tag rewriting rule, said tag rewriting rule including said condition part used for retrieving tag information which is to be changed and an action part which describes a process corresponding to said condition part, said tag information being control information of said hypertext information, wherein said condition part of said tag rewriting rule comprises a URL condition including a URL and a tag condition including a tag identifier indicating a kind of a tag;

changing said tag information according said process in said action part; and providing information in which said tag information is changed to said information terminal.

2. The learning support method as claimed in claim 1, comprising the steps of:

using a regular expression described by a pattern description language for describing said condition part or said action part;

retrieving said tag information corresponding to said condition part described by said regular expression from said obtained information;

performing said changing process on said tag information according to said action part described by said regular expression.

3. The learning support method as claimed in claim 2, wherein said action part includes a command for carrying out a process, said learning support method comprising the step of:

executing said command for changing a pattern corresponding to said condition part.

4. The learning support method as claimed in claim 2, wherein said condition part of said tag rewriting rule includes an information name, a tag name, an attribute name and an anchor name.

5. The learning support method as claimed in claim 1, wherein said action part includes a command for carrying out a process, said learning support method comprising the step of:

executing said command for changing a pattern corresponding to said condition part.

6. The learning support method as claimed in claim 1, wherein said condition part of said tag rewriting rule includes an information name, a tag name, an attribute name and an anchor name.

7. A learning support server used in a learning support system which includes an information providing server, said learning support server and an information terminal which are connected via a communication means including a computer network, said learning support server comprising:

means for obtaining, from said information providing server, information which is to be provided to said information terminal according to history information of a user when said information terminal requests said learning support server to send information; and changing means for performing a changing process for changing control information necessary for learning support on said information;

said changing means comprising:

a tag rewriting rule which includes a condition part used for retrieving tag information which is to be changed and an action part which describes a process corresponding to said condition part, said tag information being control information of hypertext information, wherein said condition part of said tag rewriting rule comprises a URL condition including a URL and a tag condition including a tag identifier indicating a kind of a tag;

tag retrieving means for retrieving tag information which corresponds to said condition part from said information which is obtained by said learning support server from said information providing server when said information is hypertext information;

tag changing means for changing said tag information according to said process in said action part; and information providing means for providing information in which said tag is changed to said information terminal.

8. The learning support server as claimed in claim 7, wherein a regular expression described by a pattern description language is used for describing said condition part or said action part, said tag retrieving means comprising:

means for retrieving said tag information corresponding to said condition part described by said regular expression from said obtained information, and said tag changing means comprising:

means for performing said changing process on said tag information according to said action part described by-said regular expression.

9. The learning support server as claimed in claim 8, wherein said action part includes a command for carrying out a process, said tag changing means comprising:

means for executing said command for changing a pattern corresponding to said condition part.

10. The learning support server as claimed in claim 8, wherein said condition part of said tag rewriting rule includes an information name, a tag name, an attribute name and an anchor name.

11. The learning support server as claimed in claim 7, wherein said action part includes a command for carrying out a process, said tag changing means comprising:

means for executing said command for changing a pattern corresponding to said condition part.

12. The learning support server as claimed in claim 7, wherein said condition part of said tag rewriting rule includes an information name, a tag name, an attribute name and an anchor name.

13. A computer readable medium storing program code for causing a computer as a learning support server to support learning in a learning support system which includes an information providing server, said learning support server and an information terminal which are connected via a communication means including a computer network, said computer readable medium comprising:

program code means for obtaining, from said information providing server, information which is to be provided to said information terminal according to history information of a user when said information terminal requests said learning support server to send information; and changing program code means for performing a changing process for changing control information necessary for learning support on said information;

said changing program code means comprising:

program code means for storing a tag rewriting rule which includes a condition part used for retrieving tag information which is to be changed and an action part which describes a process corresponding to said condition part, said tag information being control information of hypertext information, wherein said condition part of said tag rewriting rule comprises a URL condition including a URL and a tag condition including a tag identifier indicating kind of a tag;

tag retrieving program code means for retrieving tag information which corresponds to said condition part from said information which is obtained by said learning support server from said information providing server when said information is hypertext information;

tag changing program code means for changing said tag information according to said process in said action part; and information providing program code means for providing information in which said tag is changed to said information terminal.

14. The computer readable medium as claimed in claim 13, wherein a regular expression described by a pattern description language is used for describing said condition part or said action part, said tag retrieving program code means comprising:

program code means for retrieving said tag information corresponding to said condition part described by said regular expression from said obtained information, and said tag changing program code means comprising:

program code means for performing said changing process on said tag information according to said action part described by said regular expression.

15. The computer readable medium as claimed in claim 14, wherein said action part includes a command for carrying out a process, said tag changing program code means comprising:

program code means for executing said command for changing a pattern corresponding to said condition part.

16. The computer readable medium as claimed in claim 14, wherein said condition part of said tag rewriting rule includes an information name, a tag name, an attribute name and an anchor name.

17. The computer readable medium as claimed in claim 13, wherein said action part includes a command for carrying out a process, said tag changing program code means comprising:

program code means for executing said command for changing a pattern corresponding to said condition part.

18. The computer readable medium as claimed in claim 13, wherein said condition part of said tag rewriting rule includes an information name, a tag name, an attribute name and an anchor name.

\* \* \* \* \*